United States Patent Office 2,851,881
Patented Sept. 16, 1958

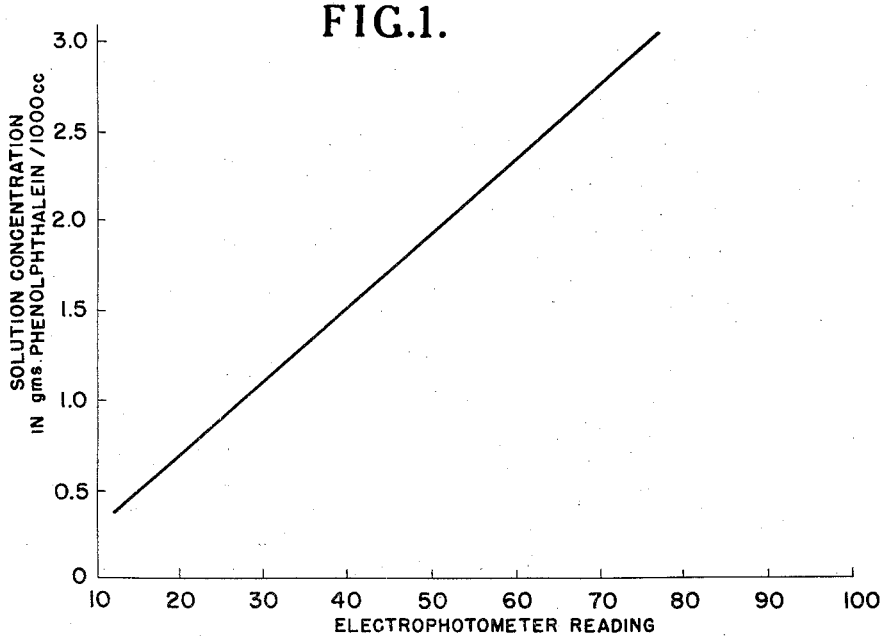
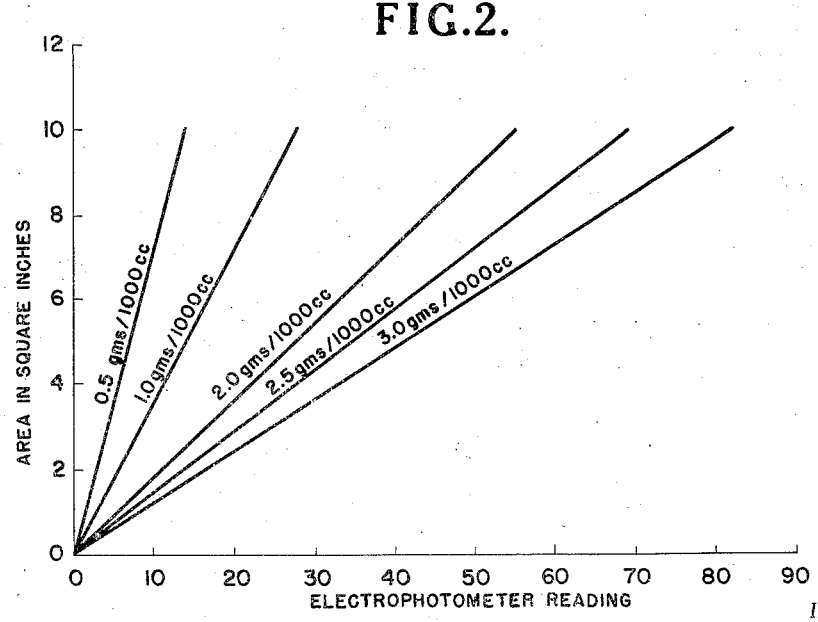
INVENTORS
J. N. DANIEL
R. M. McGREGOR
J. H. VICCELLIO
BY
ATTORNEYS

2,851,881

METHOD FOR MEASURING SURFACE AREAS

John N. Daniel and Robert M. McGregor, Williamsburg, and James H. Viccellio, Yorktown, Va.

Application April 27, 1956, Serial No. 581,256

5 Claims. (Cl. 73—149)

(Granted under Title 35, U. S. Code (1952), sec. 266)

The invention described herein may be manufactured and used by or for the Government of the United States of America for governmental purposes without the payment of any royalties thereon or therefor.

This invention relates to a method of measuring surface areas. More particularly the invention relates to a method of measuring the surface area of objects having irregular or geometrically complex surfaces.

It is often desirable or necessary to know the surface area of irregular objects or those having a geometrically complex design. Prior to treating or plating objects of this type by electrolytic means it is important to determine the total surface area as this is a prime factor in selecting the proper current density to be used. The prior art discloses no process or method whereby the total surface area of a complex geometric figure may be obtained without the use of complex mensuration formulas and laborious methematical computations. No accurate measurement of a complex surface area can be obtained where it is difficult to describe the complex surface in terms of geometrical figures. For the calculation of the surface area of any complex object a large number of physical measurements are required as well as extensive study of drawings of the object when available.

The method which is the subject of this invention allows the measuring of the total area of any irregular or geometrically complex object without the necessity of large numbers of measurements, extensive calculations or time consuming study and at the same time provides reliable results regardless of the size and complexity of the object or shape thereof. In the method of the invention the article or shape is immersed in an indicator solution of known concentration. The shape is removed and the indicator solution adhering thereto is transferred into a known volume of distilled water. A small known amount of an acid or base is then added to the water-indicator solution to produce the characteristic color of the indicator. A sample of the solution is then compared to a standard indicator solution by means of a photometer or the like.

An object of the present invention, therefore, is to provide a new and improved method of measuring the surface area of irregular or geometrically complex objects.

Another object of the invention is to provide a method of measuring the surface area of irregular or geometrically complex objects without resorting to numerous and complex physical measurements and mathematical calculations.

A further object is to provide a method of measuring the surface area of irregular or geometrically complex shapes or objects which provides reliable results.

Other objects and features of the invention will become apparent to those skilled in the art as the disclosure is made in the following detailed description taken in connection with the accompanying drawings in which Fig. 1 is graph illustrating the relation between indicator solution concentration and electrophotometer readings, and Fig. 2 illustrates graphically the relation between electrophotometer readings and the surface areas for different concentrations of indicators.

The method of the present invention is based on Lambert's law that equal fractions of incident radiant energy are absorbed in passing through successive layers of equal thickness of a homogeneous material. In accordance with this law a solution of unknown concentration may be compared with one of known concentration to determine the concentration of the former by measuring the comparative absorbtion of light passing through samples of the different solutions. This absorbtion of light may be measured by means of a photometer and, from these measurements, charts may be prepared showing curves for that photometer for various concentrations of the solution. Alternatively the photometer itself may be calibrated for standard concentrations.

Fig. 1 of the drawing is a chart showing the relationship between photometer readings and indicator solution concentrations when applied to a constant surface area.

The total area of the surfaces of the shape or object is determined by measuring the amount of standard concentration indicator solution which adheres to the surfaces of the shape or object. The indicator solution is transferred to a known volume of distilled water and after treatment with a known concentration of a base or acid a sample of the indicator solution is compared with an indicator solution of known concentration. The area of the shape may then be computed from the following formula:

$$\text{Area} = \frac{\text{Photometer reading}}{\text{Indicator solution concentration} \times 100 \text{ in gm.}/1000 \text{ cc.}}$$

Alternatively the area may be obtained by comparison of the photometer reading with charts previously prepared for shapes of known surface area. The area may also be read directly from a photometer which is calibrated against shapes of known surface area.

The invention may best be understood by reference to an example which is described by way of illustration and is not to be considered as a limitation on the invention.

Example I

Two solutions are first prepared. One is a 0.1 N solution of NaOH. The other is made up of 1.0 gm. of reagent phenolphthalein dissolved in 1000 cc. of 95% alcohol.

The object whose surface area is to be measured, thoroughly cleaned and dried, is immersed in the phenolphthalein solution until all surfaces have been wetted by the solution. When all surfaces are wet the object is removed and the excess solution allowed to drip from the surface. The object is then held over a funnel which empties into a 100 ml. volumetric flask and washed with a fine stream of distilled water until all the phenolphthalein has been removed. Five ml. of the 0.1 N NaOH solution is then added to the flask and the content diluted to the mark with distilled water. The addition of the NaOH solution produces the characteristic pinkish color of the phenolphthalein. This color density varies in direct proportion to the total surface area being measured.

A sample of the colored solution is then removed from the volumetric flask and measured on an electrophotometer which is fitted with a green filter (525–B) transmitting an approximate spectral band at 5250 angstrom units. The total surface area is then obtained from a previously prepared standard chart such as is shown on Fig. 2 of the drawing. On the chart of Fig. 2 photometer readings for standard solution concentrations are plotted against surface areas of known size. Entering the chart for the appropriate photometer reading on the appropriate concentration curve (in this case the 1.0 gm./1000 cc. curve), the area of the object may be read directly.

The overall precision of the results obtained by this method is dependent on the care taken in the performance of the various steps. Accuracies of 1% or better can be obtained with relative ease.

The complexity of the shape does not prevent measurement by this method. The total surface area of a complex geometric figure can be obtained in 5 to 10 minutes provided the two solutions have been previously prepared for use.

Instead of using a chart as described above the photometer may be calibrated directly in square inches, square feet, etc., for each solution concentration and/or other indicator solutions. Slight modifications to a standard electrophotometer will provide these added features. Standard surface areas and prepared solutions for making a series of measurements within various ranges could be maintained. The photometer could be calibrated and checked from time to time by means of the standard surface areas.

For the measurement of the surface areas of large objects a spray bath type of arrangement could be utilized. Provision could be made for either reclaiming the solutions or compensating in the photometer and reusing the same solutions.

In utilizing the method of this invention care must be taken to provide that too much of the indicator does not remain on the surface to be measured as this will introduce errors into the final results. Particular care must be taken where the object to be measured is provided with rolled edges.

Any standard acid-base indicator may be used in this method if the indicator displays a different color in the presence of an acid than it does in the presence of a base. Any suitable concentration of the indicator may be employed. The concentration of acid or base employed to bring out characteristic color of the indicator employed would depend on the nature of the indicator.

Using the method of the invention it is, therefore, possible to measure the surface area of irregular or geometrically complex objects without recourse to large numbers of physical measurements and long, laborious mathematical computations.

Obviously many modifications and variations of the present invention are possible in the light of the above teachings. It is therefore to be understood, that within the scope of the appended claims, the invention may be practiced otherwise than as specifically described.

What is claimed as new and desired to be secured by etters Patent of the United States is:

1. A method of measuring the surface area of an irregular or geometrically complex object comprising the steps of wetting the entire surface of said object with a solution of known concentration, collecting the solution which adheres to said surface, diluting to a known volume the solution so collected, and determining the concentration of said diluted solution by comparing said concentration with the concentrations of solutions prepared in a similar manner using objects of known surface area.

2. A method of measuring the surface area of an irregular or geometrically complex object comprising the steps of wetting the entire surface of said object with an indicator solution of known concentration, collecting the indicator solution which adheres to said surface, mixing sufficient water with the indicator solution so collected to increase said indicator solution a predetermined volume, and comparing the concentration of indicator in said predetermined volume with the concentration of indicator in indicator solutions prepared in a similar manner using objects of known area.

3. A method of measuring the surface area of an irregular or geometrically complex object comprising the steps of wetting the entire surface of said object with an indicator solution of known concentration, collecting the indicator solution which adheres to said surface, mixing sufficient water with the indicator solution so collected so as to produce a known volume of mixture, and comparing the concentration of indicator in said mixture with indicator mixtures of known concentration.

4. A measure of measuring the surface area of an irregular or geometrically complex object comprising the steps of wetting the entire surface of said object with a phenolphthalein solution of known concentration, collecting the phenolphthalein solution which adheres to said surface, diluting to a known volume the phenolphthalein solution so collected, and determining the concentration of phenolphthalein in the diluted solution for comparison with concentrations of phenolphthalein solutions prepared in a similar manner using objects of known surface area.

5. A method of measuring the surface area of an irregular or geometrically complex object comprising the steps of wetting the entire surface of said object with a phenolphthalein solution of known concentration, collecting the phenolphthalein solution which adheres to said surface, adding a base to said solution to cause the phenolphthalein to become colored, diluting the phenolphthalein solution to a known volume and comparing the light absorbent characteristics of said diluted solution with the light absorbent characteristics of similar phenolphthalein solutions prepared in a similar manner using objects of known surface area.

No references cited.